United States Patent [19]
Warny

[11] Patent Number: 5,665,327
[45] Date of Patent: Sep. 9, 1997

[54] PROCESS FOR THE MANUFACTURE OF ANHYDROUS SODIUM CARBONATE

[75] Inventor: Philippe Warny, Waterloo, Belgium

[73] Assignee: SOLVAY (Société Anonyme), Brussels, Belgium

[21] Appl. No.: 503,290

[22] Filed: Jul. 17, 1995

[30] Foreign Application Priority Data

Jul. 19, 1994 [FR] France .................. 94 09013

[51] Int. Cl.$^6$ .................................. C01D 7/35
[52] U.S. Cl. .................. 423/421; 423/206.2; 423/423
[58] Field of Search .................. 423/421, 206.2, 423/423

[56] References Cited

U.S. PATENT DOCUMENTS

| | | | |
|---|---|---|---|
| 2,666,686 | 1/1954 | Miller et al. | 423/423 |
| 2,851,792 | 9/1958 | Steimel et al. | |
| 3,336,104 | 8/1967 | Miller. | |
| 3,887,689 | 6/1975 | Carding et al. | 423/423 |

FOREIGN PATENT DOCUMENTS 799251 8/1958 United Kingdom.

OTHER PUBLICATIONS

John Wiley & Sons: "Encyclopedia of Chemical Technology" vol. 1, 1978, pp. 875–876.

Te–Pang Hou: "Manufacture of Soda". Hafner Publishing Company, 1969, p. 221.

*Primary Examiner*—Wayne Langel
*Attorney, Agent, or Firm*—Spencer & Frank

[57] ABSTRACT

Process for the manufacture of anhydrous sodium carbonate, according to which a drier kiln including a rotary drum (1) is used, sodium carbonate monohydrate is introduced into an upstream region (4) of the drum, anhydrous sodium carbonate is collected in a downstream region (6) of the drum and a fraction of the anhydrous sodium carbonate is recycled from the downstream region into the upstream region, the recycling of the anhydrous sodium carbonate being performed inside the drum.

13 Claims, 1 Drawing Sheet

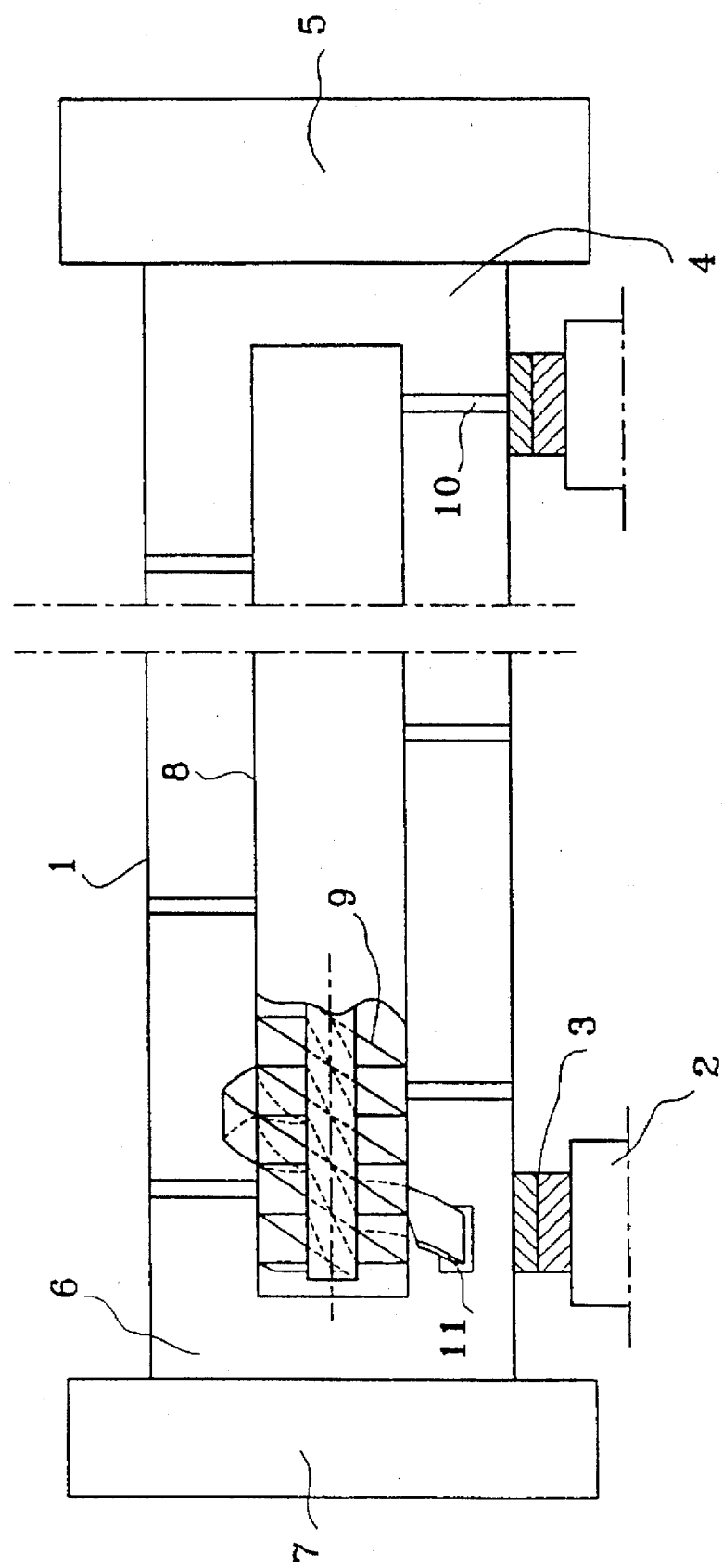

PROCESS FOR THE MANUFACTURE OF ANHYDROUS SODIUM CARBONATE

FIELD OF THE INVENTION

The invention relates to the manufacture of anhydrous sodium carbonate. It relates more particularly to a process for the manufacture of anhydrous sodium carbonate by dehydration of sodium carbonate monohydrate in a rotary drier kiln.

TECHNOLOGY REVIEW

Dehydration of sodium carbonate monohydrate is a technique widely employed for the manufacture of anhydrous sodium carbonate. It is used especially in the manufacture of sodium carbonate by refining trona (Kirk-Othmer Encyclopedia of Chemical Technology—Vol. 1—John Wiley & Sons—1978—pages 875-876). It is also employed in the process for the manufacture of soda using aqueous ammonia, for converting light sodium carbonate (or light ash) into dense sodium carbonate (or dense ash) (Manufacture of Soda—Te-Pang Hou—Hafner Publishing Company—1969—page 221).

Dehydration of sodium carbonate monohydrate is usually carried out in rotary drier kilns. These consist of a cylindrical drum, slightly inclined to the horizontal and heated. The sodium carbonate monohydrate introduced at the upstream end of the drum travels progressively in the latter under the effect of the rotation and is dehydrated as soon as it reaches a temperature higher than the temperature of transition of sodium carbonate monohydrate to anhydrous sodium carbonate; the anhydrous sodium carbonate is collected at the downstream end of the drum. The heating of the drum is performed externally, by heating the wall or by means of steam circulating in a system of pipes arranged inside the drum.

To increase the density of the anhydrous sodium carbonate produced in this type of drier kiln it is recommended to recycle a fraction of the sodium carbonate collected downstream of the kiln to the upstream end of the kiln (Manufacture of Soda—Te-Pang Hou—Hafner Publishing Company—1969—page 221).

The rotary kilns employed for the manufacture of anhydrous sodium carbonate by dehydration of sodium carbonate monohydrate are sometimes the site of considerable corrosion, and this constitutes a disadvantage of this technique.

It has now been found that the abovementioned disadvantage is linked with the recycling of the anhydrous sodium carbonate from the downstream end towards the upstream end of the kiln.

The invention is accordingly aimed at providing a means for overcoming this disadvantage.

SUMMARY OF THE INVENTION

Consequently, the invention relates to a process for the manufacture of anhydrous sodium carbonate, according to which a drier kiln including a rotary drum is used, sodium carbonate monohydrate is introduced into an upstream region of the drum, anhydrous sodium carbonate is collected in a downstream region of the drum and a fraction of the anhydrous sodium carbonate is recycled from the downstream region into the upstream region, the recycling of the anhydrous sodium carbonate being performed inside the drum.

BRIEF DESCRIPTION OF THE DRAWING

The drier kiln shown in the drawing includes a drum (1), mounted on supports (2), with the interposition of bearings (3) so that it can rotate about its lengthwise axis under the action of a motor, not shown. The drum has a slope of approximately 0.25%. At its upstream end (4), the drum (1) is in communication with a stationary vessel (5) which is in communication with a device (not shown) for allowing sodium carbonate monohydrate in powder form to enter and, also in communication with a conduit (not shown) for removing water vapor. At its downstream end (6), the drum (1) enters a vessel (7) provided with a device (not shown) for extracting anhydrous sodium carbonate from the drum.

A cylindrical tube (8) is arranged inside the drum (1), so that its axis coincides substantially with the axis of the drum. The tube (8) is open at both ends and contains an Archimedes' screw (9). The Archimedes' screw (9) is integrally attached to the wall of the tube (8), and the latter is integrally attached to the wall of the drum (1) using struts (10). Near the downstream end of the drum (1) the tube (8) carries a series of peripheral scoops (11).

DETAILED DESCRIPTION OF THE INVENTION

The drier kiln used in the process according to the invention is a rotary kiln commonly employed in the techniques for drying solid materials in the form of powder or of granules. In general, it includes a drum of revolution whose axis is slightly inclined to the horizontal, for example with a slope of the order of 0.10 to 4%. The drum is subjected to a slow rotation about its axis and is heated in a manner known per se in order to reach therein a temperature which is higher than the temperature of transition of sodium carbonate monohydrate to anhydrous sodium carbonate, for example a temperature from 2° to 10° C. higher than the said transition temperature. Sodium carbonate monohydrate is introduced into an upstream region of the drum. An upstream region is intended to mean a region of the drum which is situated in the immediate vicinity of the upstream end of the drum, corresponding, for example, to 10% of the length of the drum, counting from the upstream end of the latter. Under the effect of the rotation of the drum the sodium carbonate moves forward in the drum, from upstream to downstream, and is heated progressively until it reaches a temperature which is higher than the abovementioned transition temperature, before reaching the downstream region of the drum. As a result, in the downstream region of the drum the sodium carbonate is in the essentially anhydrous state. By definition, the downstream region of the drum is a region of the drum which is situated in the immediate vicinity of its downstream end, corresponding, for example, to 10% of the length of the drum, counting from the downstream end of the latter. The sodium carbonate monohydrate is preferably introduced into the drum at a temperature which is higher than 50° C., for example, 80° to 100° C., and the anhydrous sodium carbonate is extracted from the drum at a temperature which is higher than 107° C., but preferably does not exceed 200° C., for example from 120° to 180° C.

According to the invention a fraction of the sodium carbonate from the downstream region of the drum is recycled into the upstream region, and this recycling is performed inside the drum. The fraction of sodium carbonate which is recycled from the downstream region into the upstream region is not critical for obtaining the result sought after by the invention. It is generally at least 50% (preferably 75%) by volume relative to the volume flow rate of sodium carbonate monohydrate introduced into the upstream region of the drum. It generally does not exceed 250% (preferably 200%) of this flow rate, volume fractions of 75 to 150% being suitable.

Everything else being otherwise the same, it was observed that, when the recycling of the anhydrous sodium carbonate was performed inside the drum, the corrosion of the drum was greatly reduced in comparison with what it is in the case when the recycling is performed outside the drum. Although not desiring to be bound by a theoretical explanation, the inventors believe that, in the processes of the prior art, the corrosion of the kilns is linked with the hygroscopic nature of anhydrous sodium carbonate and with the temperature prevailing in the kiln and that, when the recycling of the anhydrous sodium carbonate is performed via the inside of the kiln, an untimely entry of air into the latter and, consequently, oxidation of the kiln wall are avoided.

According to a particular embodiment of the process according to the invention, in order to recycle the anhydrous sodium carbonate, it is circulated, from the downstream region towards the upstream region, in a tube arranged coaxially in the drum. In this embodiment of the process according to the invention the circulation of anhydrous sodium carbonate inside the tube is advantageously obtained by means of an Archimedes' screw. To this end, the Archimedes' screw is advantageously integrally attached to the tube which is itself integrally attached to the drum, the removal of the fraction of sodium carbonate in the downstream region of the drum and its transfer into the tube being obtained by means of a scoop secured to the wall of the tube, facing the tube end situated in the said downstream region. A drier kiln usable in this embodiment of the process according to the invention is that described in U.S. Pat. No. 2,851,792.

Special features and details of the invention will emerge from the following description of the single figure of the attached drawing, which is a lengthwise view, in axial section, with partial cutaway, of a drier kiln suitable for the use of a particular embodiment of the process according to the invention.

The drier kiln shown in the drawing is in accordance with that described in U.S. Pat. No. 2,851,792. It includes a drum 1, mounted on supports 2, with the interposition of bearings 3 so that it can rotate about its lengthwise axis under the action of a motor, not shown. The drum has a slope of approximately 0.25%. At its upstream end 4, the drum 1 is in communication with a stationary vessel 5 which is in communication, on the one hand, with a device (not shown) for allowing sodium carbonate monohydrate in powder form to enter and, on the other hand, with a conduit (not shown) for removing water vapour. At its downstream end 6, the drum 1 enters a vessel 7 provided with a device (not shown) for extracting anhydrous sodium carbonate out of the drum. The device for allowing sodium carbonate monohydrate to enter the drum 1 and the device for extracting anhydrous sodium carbonate are well known.

A cylindrical tube 8 is arranged inside the drum 1, so that its axis coincides substantially with the axis of the drum. The tube 8 is open at both its ends and contains an Archimedes'0 screw 9. The Archimedes' screw 9 is integrally attached to the wall of the tube 8 and the latter is integrally attached to the wall of the drum 1 using struts 10. Near the downstream end of the drum 1 the tube 8 carries a series of peripheral scoops 11.

The kiln additionally comprises, inside the drum 1, a system of pipes, which are not shown and are localized in the vicinity of the wall of the drum and intended to carry steam and its condensate in order to heat the atmosphere in the drum.

When the process according to the invention is implemented by means of the kiln shown in the drawing, steam is circulated in the system of pipes so as to produce in the drum a temperature which is higher than the temperature of transition of anhydrous sodium carbonate and of sodium carbonate monohydrate, and the drum is driven in rotation. Sodium carbonate monohydrate is introduced into the drum 1 via the upstream vessel 5. Under the action of the rotation of the drum the sodium carbonate monohydrate moves forward towards the downstream end of the drum and is converted into anhydrous sodium carbonate as soon as its temperature in the drum exceeds the abovementioned transition temperature. At the downstream end of the drum the anhydrous sodium carbonate flows into the vessel 7, from which it is extracted and collected. Since the drum is maintained at a slightly reduced pressure, the water vapour formed moves up the drum, from downstream towards upstream and is removed in the vessel 5.

A sill (not shown) arranged at the downstream end of the drum maintains a substantially constant level of material in the drum, with the result that under the effect of the rotation of the latter, the scoops 11 dip at regular intervals into the anhydrous sodium carbonate in the drum and spill it into the tube 8. The anhydrous sodium carbonate thus spilt into the tube 8 is driven therein, by the Archimedes' screw, towards the upstream end of the drum, where it rejoins the sodium carbonate monohydrate entering the drum from the vessel 5. The scoops 11 are, for example, sized so that the volume flow rate of anhydrous sodium carbonate which they remove and spill into the tube 8 is approximately equal to the volume flow rate of the sodium carbonate monohydrate entering the drum 1, originating from the upstream vessel 5. Furthermore, the temperature profile in the drum is advantageously controlled so as to introduce the sodium carbonate monohydrate at a temperature of approximately 100° C. into the drum and to remove the anhydrous sodium carbonate therefrom at a temperature of approximately 150° C.

The process which has just been described with reference to the drawing finds an advantageous application to the treatment of the sodium carbonate monohydrate obtained as intermediate product in the manufacture of sodium carbonate by refining trona. It also applies to the manufacture of dense ash by dehydration of the sodium carbonate monohydrate obtained from light ash manufactured by means of the ammonia-soda process.

What is claimed is:

1. A process for the manufacture of anhydrous sodium carbonate in a drier kiln while avoiding oxidation of kiln walls, said kiln including a rotary drum with an upstream region and a downstream region, comprising:

introducing sodium carbonate monohydrate into said upstream region of said drum, collecting anhydrous sodium carbonate in said downstream region of said drum and recycling a fraction of said anhydrous sodium carbonate from said downstream region into said upstream region of said drum, said recycling of said anhydrous sodium carbonate being performed inside the drum while avoiding oxidation of kiln walls by avoiding entry of air into the drum.

2. The process according to claim 1, wherein said recycling of a fraction of anhydrous sodium carbonate comprises circulating said fraction from the downstream region towards the upstream region of the drum, in a tube arranged coaxially in the drum.

3. The process according to claim 2, wherein said fraction of sodium carbonate is circulated in the tube by rotation of an Archimedes' screw housed in the tube.

4. The process according to claim 3, wherein the Archimedes' screw is integrally attached to the tube, which is integrally attached to the drum.

5. The process according to claim 4, wherein said fraction of anhydrous sodium carbonate is removed by means of at least one scoop secured to the wall of the tube, facing the tube end which is situated in the downstream region of the drum.

6. The process according to claim 1, comprising introducing said sodium carbonate monohydrate into the drum at a temperature of 80° to 100° C. and extracting said anhydrous sodium carbonate from the drum at a temperature of 120° to 180° C.

7. The process according to claim 1, wherein said fraction of anhydrous sodium carbonate which is recycled is from 75 to 150% by volume relative to the volume flow rate of said sodium carbonate monohydrate introduced into the upstream region of the drum.

8. The process according to claim 1 wherein said sodium carbonate monohydrate which is introduced into said upstream region of said drum comprises an intermediate product in the manufacture of sodium carbonate by refining trona.

9. The process according to claim 1, wherein said sodium carbonate monohydrate which is introduced into said upstream region of said drum comprises sodium carbonate monohydrate obtained from light ash manufactured by means of the ammonia-soda process.

10. A process for the manufacture of anhydrous sodium carbonate in a drier kiln and avoiding oxidation of the kiln walls, said kiln including a rotary drum with upstream region and a downstream region, comprising:

introducing sodium carbonate monohydrate into said upstream region of said drum at a temperature of 80° to 100° C., collecting anhydrous sodium carbonate in said downstream region of said drum at a temperature of 120° to 180° C., and recycling from 75% to 150% by volume relative to the volume flow rate of said sodium carbonate monohydrate introduced into the upstream region of the drum, of said anhydrous sodium carbonate from said downstream region into said upstream region of said drum, said recycling of said anhydrous sodium carbonate being circulated from the downstream region towards the upstream region of the drum by rotation of an Archimedes' screw housed in a tube arranged coaxially in the drum, the Archimedes' screw being integrally attached to the tube, which is integrally attached to the drum, while avoiding entry of air into the drum.

11. The process according to claim 10, wherein said fraction of anhydrous sodium carbonate is removed by means of at least one scoop secured to the wall of the tube, facing the tube end which is situated in the downstream region of the drum.

12. The process according to claim 10, wherein said sodium carbonate monohydrate which is introduced into said upstream region of said drum comprises an intermediate product in the manufacture of sodium carbonate by refining trona.

13. The process according to claim 10, wherein said sodium carbonate monohydrate which is introduced into said upstream region of said drum comprises sodium carbonate monohydrate obtained from light ash manufactured by means of the ammonia-soda process.

* * * * *